United States Patent [19]
Yared

[11] Patent Number: 5,323,689
[45] Date of Patent: Jun. 28, 1994

[54] METHOD OF MANUFACTURING A TANDEM BRAKE BOOSTER

[75] Inventor: Linda S. Yared, South Bend, Ind.
[73] Assignee: Allied-Signal Inc., Morristown, N.J.
[21] Appl. No.: 951,491
[22] Filed: Sep. 24, 1992
[51] Int. Cl.$^5$ .......................... F01B 19/00; F15B 9/10
[52] U.S. Cl. .......................................... 92/48; 92/99; 91/376 R; 91/533; 91/471
[58] Field of Search ................ 92/48, 49, 98 R, 98 D, 92/99, 101; 91/369.1, 376 R, 533, 471

[56] References Cited

U.S. PATENT DOCUMENTS

| | | |
|---|---|---|
| 3,146,682 | 9/1964 | Price et al. . |
| 3,517,588 | 6/1970 | Kytta . |
| 3,813,992 | 6/1974 | Brown ..................... 91/189 |
| 4,267,766 | 5/1981 | Horsting . |
| 4,587,884 | 5/1986 | Tsubouchi ................ 92/48 X |
| 4,976,188 | 12/1990 | Suzuki et al. ............ 92/48 X |
| 4,987,824 | 1/1991 | Shinohara et al. . |
| 5,027,692 | 7/1991 | Satoh et al. ............. 92/48 X |
| 5,029,515 | 7/1991 | Endo .................. 91/376 R X |
| 5,076,142 | 12/1991 | Steer et al. ............ 91/369.3 |
| 5,083,495 | 1/1992 | Satoh . |
| 5,111,734 | 1/1992 | Suzuki et al. . |
| 5,115,719 | 5/1992 | Endo . |
| 5,121,673 | 6/1992 | Araki . |
| 5,142,964 | 9/1992 | Suzuki . |
| 5,158,004 | 10/1992 | Bauer . |
| 5,161,453 | 11/1992 | Yared et al. . |
| 5,170,628 | 12/1992 | Satoh et al. ............ 92/48 X |
| 5,178,054 | 1/1993 | Shinobara . |
| 5,233,911 | 8/1993 | Rossigno ........... 91/376 R X |

Primary Examiner—Edward K. Look
Assistant Examiner—Hoang Nguyen
Attorney, Agent, or Firm—Leo H. McCormick, Jr.; Ken C. Decker

[57] ABSTRACT

A method of manufacturing a tandem brake booster by selectively choosing a front shell having a first cylindrical body with first effective diameter, a transition shell having a second cylindrical body with a second effective diameter and a rear shell having a third cylindrical body with a third effective diameter. The cylindrical body of the transition shell is an integral component of an end wall which separates the interior the resulting tandem brake booster. The end wall has a peripheral ledge with a flange extending therefrom and a groove located on the flange connected to the second cylindrical body. An annular surface on the first cylindrical body is crimped into the groove on the flange while a corresponding annular surface on the second cylindrical body is crimped onto the third cylindrical to join the transition shell with the rear shell to form an integral unit.

9 Claims, 1 Drawing Sheet

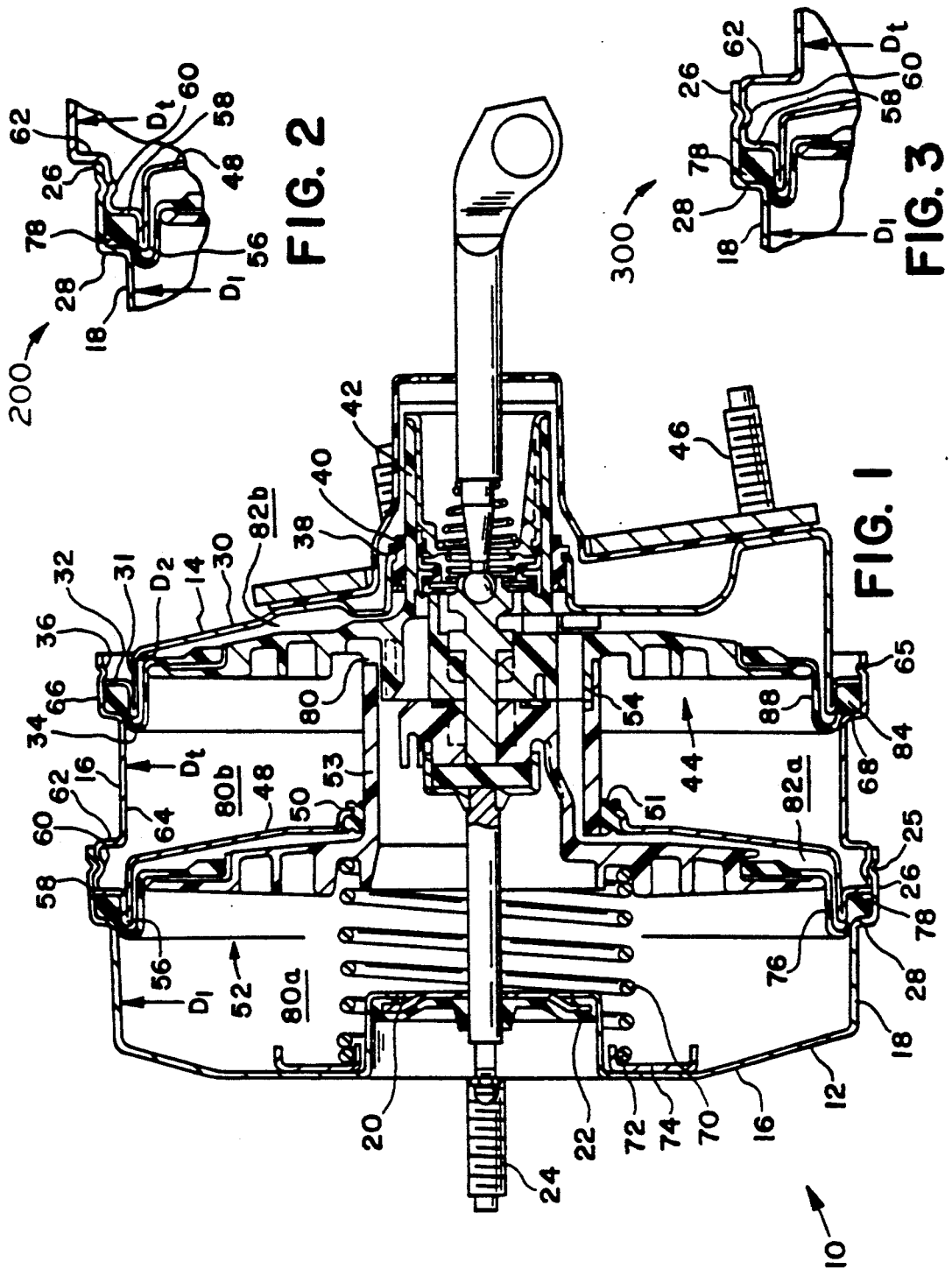

METHOD OF MANUFACTURING A TANDEM BRAKE BOOSTER

A method of joining a front shell to a rear shell with a transition shell to form a tandem brake booster.

This invention relates to a method of manufacturing a tandem brake booster by selectively choosing a front shell with a first effective diameter, a rear shell with a second effective diameter and joining the front shell to the rear shell through a transition shell to form an integral unit.

It is common practice for a housing for a brake booster to be manufactured from a front shell which is joined to a rear shell through some type of lancing operation, such as disclosed in U.S. Pat. No. 4,267,766. In this type booster, the front shell and the rear shell have the same diameter and as a result a uniform appearance is produced. In an effort to increase the output of brake boosters various methods have been devised to double the size of the housing while maintaining the same effective diameter. U.S. Pat. Nos. 3,146,682; 3,289,547; 3,517,588; 5,076,142 and 5,233,911 disclose various tandem brake boosters wherein a front shell functions as part of the housing for a plurality of movable wall to produce an output force which is greater than a single brake booster. In this type tandem brake booster the increase in size or length is normally achieved by an increase in the front shell. The increase in physical size in the front shell requires larger stamping equipment and storage space than corresponding shells for a single brake booster. In an effort to manufacture a tandem brake booster out of components developed for a single brake booster, a method is disclosed in U.S. Pat. No. 3,813,992 for joining two single brake booster together. This type of tandem brake booster may function in an adequate manner but an increase in the weight may not be acceptable for most customers. In an effort to reduce the inventory of components that must be stored to meet various braking requirements commonality of components for single and tandem brake booster has been determined as a means for reducing cost while meeting such requirements.

In the present invention a transition shell has been developed to form a link between a standard single front and rear shells. In this transition shell, an end wall has a central opening therein through which an annular projection on a first separation wall extends for engagement with a second separation wall. The end wall has a peripheral ledge with a flange extending therefrom. The flange has a peripheral groove therein from which extends a cylindrical body. The cylindrical body has a first diameter section separated from a second diameter section by a transition shoulder. The peripheral ledge has a diameter substantially identical to a functional diameter a first cylindrical body on the front shell while the flange has a diameter substantially identical with an annular surface on the first cylindrical body. The annular surface being crimped into the groove on the flange of the transition shell to join the front shell with the transition shell while retaining a first bead of a first diaphragm of the first separation wall between the flange, peripheral ledge and a shoulder formed on the first cylindrical body between the functional diameter and annular diameter to seal first and second chambers created therein from each other and the surrounding environment. The second diameter section of the cylindrical body of the transition shell has substantially the same diameter as a peripheral surface on the rear shell. The second diameter is designed to be crimped into a groove on the peripheral surface on the rear shell to join the rear shell to the transition shell while retaining a first bead of a second diaphragm of the second separation wall to seal third and fourth chambers formed therein from each other and the surrounding environment. The transition shell allows front and rear shells designed for various sized single brake boosters to be joined together to form a integral unit for a tandem brake booster to meet various output and space requirements.

The advantage of being able to manufacture a tandem brake booster from various diameter front and rear shells through the use of a transition shell should be apparent from reading this specification while viewing the drawings wherein:

FIG. 1 is a sectional view of a tandem brake booster manufacture according to the principles of the present invention wherein a transition shell joins a front shell with a substantially identical effective diameter rear shell;

FIG. 2 is a schematic illustration of a portion of a connection joint between a transition shell and a front shell for a tandem brake booster wherein the transition shell has an effective diameter substantially identical to the rear shell which is larger than the front shell; and FIG. 3 is a schematic illustration of a portion of a connection joint between a transition shell and a front shell wherein the transition shell has an effective diameter substantially identical to the rear shell which is smaller than the front shell.

FIG. 1 illustrates a unitary structure for a tandem brake booster 10 having a front shell 12 joined to a rear shell 14 by a transition shell 16. The front shell 12 which is selected from a source supply for single brake boosters has a first effective diameter $D_1$ while the rear shell which is also selected from a source supply for single brake boosters has a second substantially identical effective diameter $D_2$. The first and second effective diameters being selected to form a resulting output force to meet a desired operational specification. FIG. 2 illustrates a portion of a tandem brake booster 200 wherein the transition shell joins a front shell with a rear shell wherein the first effective diameter is smaller than the second effective diameter while FIG. 3 illustrates a portion of a tandem brake booster 300 wherein the first effective diameter is larger than the second effective diameter. The effective areas and combinations thereof are primarily selected to meet output requirements but are also selected to meet some space requirements imposed by available installation space.

The front shell 12 has an end wall 16 with a cylindrical body 18 having an effective diameter $D_1$ extending therefrom. End wall 16 has axial opening 20 therein with a seal 22 through which push rod 24 communicates an output force to a master cylinder. The effective diameter $D_1$ for cylindrical body 18 is connected to an annular diameter section 26 by a shoulder 28.

The rear shell 14 has an end wall 30 with a cylindrical body 31 having an effective diameter $D_2$ extending therefrom. A ledge 34 on the cylindrical body 31 has a flange 32 extending therefrom with a groove 36 located therein. End wall 30 has an axial opening 38 with a seal 40 therein that engages a cylindrical projection 42 on separation wall 44. Bolts 46, only one is shown, extend through end wall 30 for attaching the resulting tandem brake booster to a vehicle.

The transition shell 16 as shown in FIG. 1 has an end wall 48 with a central opening 50 therein through which an annular projection 53 on separation wall 52 extends for engagement with a hub 54 on separation wall 44. End wall has a peripheral ledge 56 with a diameter which matches the effective diameter $D_1$ on cylindrical body 18. Ledge 56 has a flange 58 extending therefrom with a peripheral groove 60 located therein. A radial section 62 which can extend either outward as in FIG. 2 or inward as in FIGS. 1 and 3 connects flange 58 with a cylindrical body 64. Cylindrical body 64 has an effective diameter $D_t$ which matches the effective diameter $D_2$ on rear shell 14 and is separated from a second diameter 66 by a shoulder 68. A crimp 25 placed in annular surface 26 extends into groove 60 to join shell 12 to the transition shell 16 while a similar crimp 65 placed in the second diameter surface 66 joins the rear shell 14 to the transition shell 16 to form the resulting tandem brake booster 10.

The method of manufacture of the tandem brake booster 10 is follows the following steps in the assembly of the components therein to form a unitary structure.

A front shell 12 with an effective diameter $D_1$ is selected from a source of supply. The selected front shell 12 is placed in a fixture with shoulder 28 located on a stationary support. A return spring 70 is placed in the front shell 12 with a first end 72 thereof engaging a reinforcing plate 74. Separation wall 52 with diaphragm 76 attached thereto is inserted into the front shell 12 with a first bead 78 located adjacent shoulder 28. Bead 78 also engages the second diameter surface 26 to hold an axial projection 53 associated with separation wall 52 in the center of the front shell 12. Thereafter, a transition shell 16 is obtained from a source supply having an effective diameter $D_t$ selected such that a desired resulting output force will be produced when combined with the effective diameter $D_1$ for front shell 12. Projection 53 passes through seal 51 in opening 50 and ledge 56 is brought into engagement with bead 78. Thereafter, a force is applied to compress return spring 70 and bring flange 58 into engagement with bead 78. The force applied to flange 58 compresses bead 78 between flange 58 and shoulder 78 to form a seal which defines limits for a first chamber 80a and a second chamber 82a with the surrounding environment. A lancing apparatus has a fixture of the type disclosed in U.S. Pat. No. 4,366,612 which is brought into engagement with annular surface 26 and portions thereon are crimped into groove 60 to join the first shell 12 to the transition shell 16. At this stage in the manufacture of the tandem brake booster 10 return spring 70 urges separation wall 52 into engagement with end wall 48 on the transition shell 16. After joining the transition shell 16 to the front shell 14, hub 54 is brought into engagement with the end 80 of projection 53 and bead 84 on diaphragm 88 is located against shoulder 68. After selecting rear shell 14, shell 14 is located on cylindrical projection 42 with separation wall 44 extending through seal 38 in opening 40. A closure force which is applied to flange 32 to bring ledge 34 into engagement with bead 84 and compresses bead 84 between flange 32 and shoulder 68 to form a seal between resulting chambers 80b and 82b formed therein. The closure force is maintained and a lancing apparatus applies a crimp force to surface 66 to deform a portion 65 thereof into groove 38 to join transition shell 16 to rear shell 14. This closure which brings end wall 30 into engagement with separation wall 44 and moves separation wall 52 away from end wall 48 creates a stop on end wall 30 for separation walls 44 and 52 and is sufficient to assure that communication paths between chambers 80a and 80b and 82a and 82b through hub 54 are established in a manner as disclosed in U.S. patent application Ser. No. 843,678.

Through the method of manufacture as disclosed herein, it is possible to match a tandem brake booster 10 with operational requirements while selectively defining the physical shape in accordance with space available in a vehicle.

I claim:

1. A method of manufacturing a tandem brake booster comprising the steps of:

selecting a first shell from a first source, said first shell having a first end wall with a first cylindrical body extending therefrom, said first end wall having a first axial opening therein, said first cylindrical body having a first diameter section separated from a second diameter section by a first shoulder;

placing a return spring in said first shell with a first end thereof engaging said end wall;

locating a first separation wall on said first shell, said first separation wall including a first diaphragm with a first bead located adjacent said first shoulder on said cylindrical body and a second bead retained on said first separation wall, said first separation wall having a first axial projection extending therefrom;

selecting a second shell from a second source, said second shell having a second end wall with a second cylindrical body extending therefrom, said second end wall having a second axial opening therein, said second end wall having a peripheral rib thereon with a groove therein, said second cylindrical body having a third diameter section separated from a fourth diameter section by a second shoulder;

placing said second shell on said first shell with said first axial cylindrical projection of said first separation wall extending through said second axial opening and said peripheral rib engaging said first bead on said first diaphragm;

applying a first force to said second shell to compress said return spring while urging said first bead into sealing engagement with said first shoulder;

crimping said second diameter of said first cylindrical member into said first groove to join said first shell with said second shell to define a first chamber between said first separation wall and said first shell and a second chamber between said separation wall and said second shell;

locating a second separation wall on said second shell, said second separation wall including a hub which engages said first cylindrical projection, a second diaphragm with a first bead located adjacent said second shoulder and a second bead retained on said second separation wall and a second axial projection, said second axial projection retaining control means;

selecting a third shell from a third source, said third shell having a second end wall with a flange on its peripheral surface, said second end wall having a third axial opening;

placing said third shell on said second separation wall with said second axial projection extending through said third axial opening and said flange engaging said first bead on said second diaphragm;

applying a second force to said third shell to compress said second bead between said flange and said second shoulder;

crimping said fourth diameter on said flange to join said second shell to said third shell to define a third chamber between said second shell and said second separation wall and a fourth chamber between said second separation wall and said third shell, said first and third chambers being connected together while said second and fourth chambers are connected together, said control means being adapted to sequentially communicate fluid to said second and fourth chambers to create an operational pressure differential for moving said first and second separations wall to develop an output force.

2. The method as recite in claim 1 wherein said step of applying said second force to said third shell moves and compresses said return spring to establish a stop on said third shell while establishing a seal between said first cylindrical projection and said hub to establish continuity of passages between said first and third and second and fourth chambers.

3. The method as recited in claim 2 wherein said third diameter of said selected second shell is larger than said first diameter.

4. The method as recited in claim 2 wherein said third diameter of said selected second shell is smaller than said first diameter.

5. The method as recited in claim 2 wherein said third diameter of said selected second shell is substantially the same as said first diameter.

6. In a tandem brake booster having a housing with a front shell joined to a rear shell with an interior cavity formed there divided by a first separation wall and a second separations wall to isolating a first chamber from a second chamber and a third chamber from a fourth chamber, respectively, said first and second separation walls being separated from each other by a partition, the improvement in the partition comprising:

a transition shell for connecting said front shell with said rear shell, said transition shell having an end wall with a central opening therein through which an annular projection on said first separation wall extends for engagement with said second separation wall, said end wall having a peripheral ledge with a flange extending therefrom, said flange having a peripheral groove therein and a cylindrical body extending from said flange, said cylindrical body having a first diameter section separated from a second diameter section by a transition shoulder, said peripheral ledge having a diameter substantially identical to a functional diameter of a first cylindrical body on said front shell while said flange has a diameter substantially identical with an annular surface on said first cylindrical body, said annular surface being crimped into said groove on said flange of said transition shell to join said front shell with said transition shell while retaining a first bead of a first diaphragm of said first separation wall between said flange, peripheral ledge and a shoulder formed on said first cylindrical body between said functional diameter and annular diameter to seal said first and second chambers from each other and the surrounding environment, said second diameter section being substantially the same diameter as a peripheral surface on said rear shell, said second diameter being crimped into a rear groove on said peripheral surface on said rear shell to join said rear shell to said transition shell while retaining a first bead of a second diaphragm of said second separation wall to seal said third and fourth chambers from each other and the surrounding environment.

7. The tandem brake booster as recited in claim 6 wherein said first diameter of said transition shell is larger than said functional diameter of said front shell.

8. The tandem brake booster as recited in claim 6 wherein said first diameter of said transition shell is smaller than said functional diameter of said front shell.

9. The tandem brake booster as recited in claim 6 wherein said first diameter of said transition shell is substantially the same diameter as said functional diameter of said front shell.

* * * * *